United States Patent [19]

Breikss

[11] 3,792,443

[45] Feb. 12, 1974

[54] RECORDING AND PLAYBACK SYSTEM FOR SELF-CLOCKING DIGITAL SIGNALS

[75] Inventor: Ivars P. Breikss, Littleton, Colo.

[73] Assignee: Honeywell Inc., Minneapolis, Minn.

[22] Filed: Apr. 14, 1972

[21] Appl. No.: 244,059

[52] U.S. Cl. ........... 340/172.5, 340/174.1, 178/69.5

[51] Int. Cl. .......................... G11b 5/00, H03k 5/20

[58] Field of Search .......... 340/174.1 A, 172.5, 347; 178/69.5

[56] References Cited

UNITED STATES PATENTS

| | | | |
|---|---|---|---|
| 3,391,400 | 7/1968 | Chao | 340/174.1 A |
| 3,427,605 | 2/1969 | Gabor | 340/174.1 A |
| 3,609,560 | 9/1971 | Greenberg | 178/69.5 |
| 3,576,947 | 5/1971 | Kruger | 178/69.5 |
| 3,611,161 | 10/1971 | Claxton | 178/69.5 |
| 3,123,810 | 3/1964 | Strauch et al. | 340/174.1 A |
| 3,653,036 | 3/1972 | Whiting | 340/174.1 A |
| 3,636,536 | 1/1972 | Norris | 340/174.1 A |

*Primary Examiner*—Gareth D. Shaw
*Assistant Examiner*—Mark Edward Nusbaum
*Attorney, Agent, or Firm*—Arthur H. Swanson; Lockward D. Burton; Mitchell J. Halista

[57] ABSTRACT

A recording and reproducing system for recording input digital data in a self-clocking encoded format and periodically inserting synchronizing words in the digital data stream and for reproducing the recorded data in its original format by decoding the reproduced signal while removing the inserted synchronizing words from the decoded signal.

4 Claims, 3 Drawing Figures

RECORDING AND PLAYBACK SYSTEM FOR SELF-CLOCKING DIGITAL SIGNALS

BACKGROUND OF THE INVENTION

The present invention is directed to a digital information code converter or encoder suitable for encoding an input data signal to another form especially for recording on a recording medium and to a decoder for playing back, or reproducing, the recorded signals and converting the reproduced signals into the original digital information. A known type of encoder produces a self-clocking signal in which an amplitude transition occurs in the middle of a digital bit cell for one type of binary digital data and between bit cells for two successive ones of the other type of binary digital data. Such a code includes transitions which, when reproduced, can be used to produce a clock, or timing, signal and the decrease in the number of transitions over other type codes allows a denser packing of the information on the recording medium. To correctly decode such an encoded signal, the synthesized clock signal must have the correct frequency and phase relationship.

An object of the present invention is to provide an improved recording and reproducing system for binary digital data.

Another object of the present invention is to provide an improved recording and reproducing system for binary digital data using an encoding for periodically inserting a synchronizing word in a data bit stream and a decoder for removing the synchronizing words.

SUMMARY OF THE INVENTION

In accomplishing these and other objects, there has been provided, in accordance with the present invention, a recording and reproducing system including signal recording means having means for periodically inserting synchronizing words in a data bit stream while encoding input data and reproducing means for recognizing and removing the synchronizing words while decoding the reproduced data into its original format.

BRIEF DESCRIPTION OF THE DRAWINGS

A better understanding of the present invention may be had when the following detailed description is read in connection with the accompanying drawings, in which.

DETAILED DESCRIPTION

Figure 1:
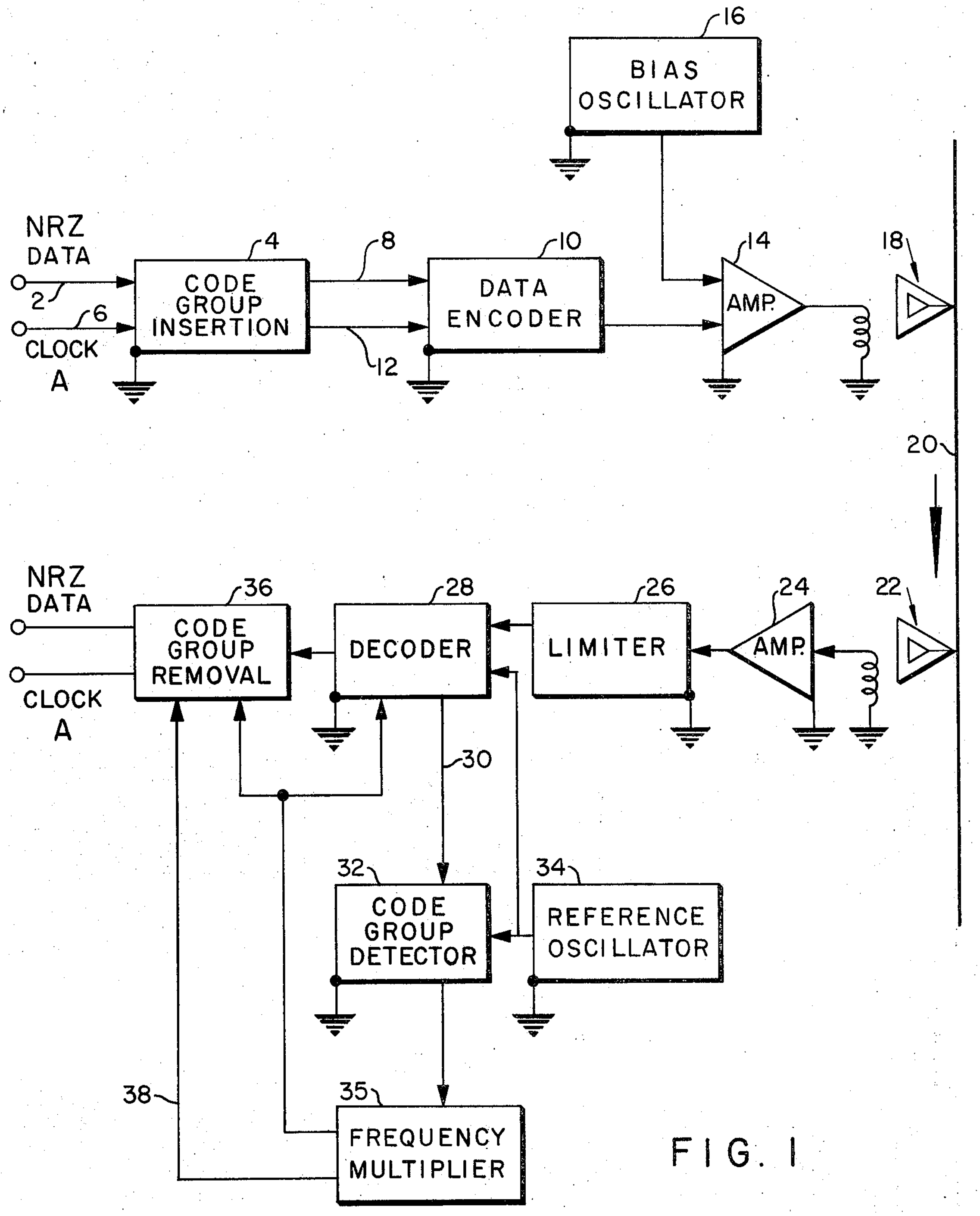
FIG. 1 is a block diagram of a recording and playback system embodying the present invention.

Referring to FIG. 1 in more detail, there is shown a recording and playback system suitable for use in magnetic recording. Digital data in the form of a non-return-to-zero, i.e., NRZ, format is applied along an input line to a first input of a code group insertion circuit 4. A clock signal is applied along line 6 to a second input of the code group insertion circuit 4. An output signal from the code group insertion circuit 4 consisting of the original data and a periodically inserted code group is applied along an output line 8 to a data encoder 10 for encoding into a coded data stream for high density digital recording using any suitable well-known encoding technique such as that shown in U.S. Pat. No. 2,734,186. A clock signal is also applied to the data encoder 10 from the code group insertion circuit 4 along a clock line 12. The output from the data encoder 10 is applied to a recording amplifier 14 concurrently with an output signal from a bias oscillator 16 for recording using conventional bias recording techniques. The output signal from the recording amplifier 14 is applied to a magnetic recording head 18 for recording the data signal on a magnetic recording medium 20. The magnetic recording medium 20 is transported by any suitable means (not shown) in the direction of the arrow illustrated in FIG. 1.

A playback head 22 is arranged downstream of the recording head 18 to pick up the signals recorded on the magnetic recording medium 20. Alternatively, the playback head 22 may be located on a separate playback apparatus to which a recorded tape is transferred after recording by the recording head 18. An output signal from the playback head 22 is applied to a playback amplifier 24. An output signal from the playback amplifier 24 is limited by a limiter circuit 26 and is applied to a decoder circuit 28 such as that shown in the aforesaid U.S. Pat. No. 2,734,186, for decoding the data from the coded format produced by the aforesaid data encoder 10. A signal representing the detected code group previously inserted by the code group insertion circuit 4 is applied along an output line 30 from the decoder 28 to a code group detector 32. A reference oscillator 34 is arranged to supply a fixed frequency signal to the decoder 28 and the code group detector 32. A frequency multiplier 35 produces a first clock signal which is applied to the decoder 28 and to a code group removal circuit 36. A second output signal from the frequency multiplier 35 is applied along a sync line 38 to the code group removal circuit 36 to synchronize the operation thereof. A first output signal from the code group removal circuit 36 is representative of the recorded data in the original format, e.g., a non-return-to-zero, or NRZ, format. A second output from the code group removal circuit 36 is a synthesized clock signal corresponding to the recorded clock signal A applied to the recording circuit on input line 6.

Figure 2:
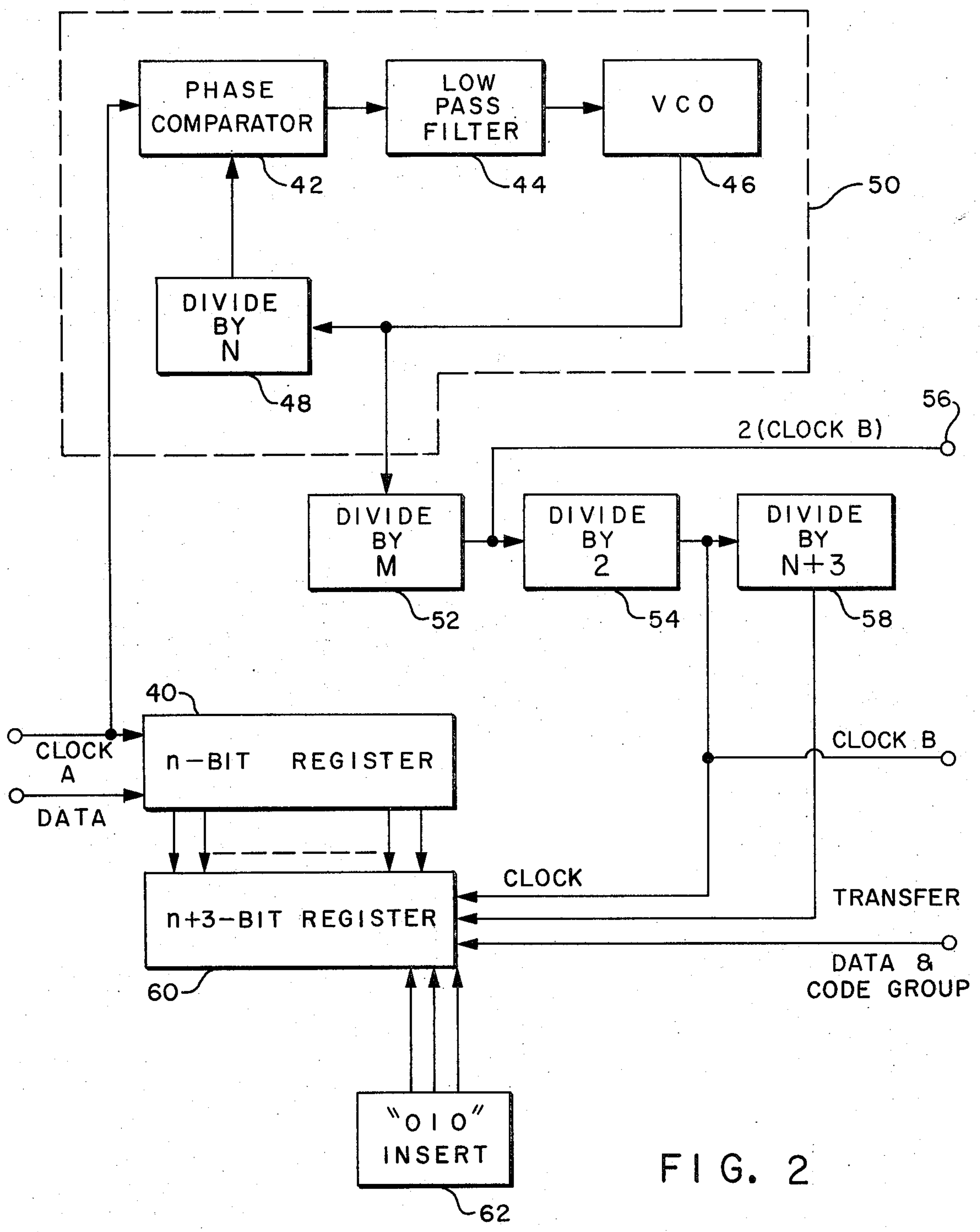
FIG. 2 is a block diagram of a code group insertion circuit suitable for use with the system shown in FIG. 1.

In FIG. 2 there is shown a block diagram of a circuit suitable for use as the code group insertion circuit 4. The data line 2 and the clock line 6 are shown in FIG. 2 with reference numerals similar to those used in the foregoing description of FIG. 1. The clock A input signal on input line 6 is applied to a clock input of an N-bit register 40 to control the storing of data therein. The input data on input line 2 is applied to the data input of the N-bit register 40 to be stored therein under the control of the clock signal on line 6. The clock signal on line 6 is also applied to a phase comparator 42 to be compared with a second input signal which is obtained as hereinafter described. An output signal from the phase comparator 2 is applied through a low pass filter 44 to a voltage controlled oscillator 46. The output from the voltage controlled oscillator 46 is applied to a divide-by-N circuit 48, and an output from the divide-by-N circuit is used to provide the second input signal to the phase comparator 42. The combination of the phase comparator 42, the low pass filter 44, the voltage controlled oscillator 46 and the divide-by-N circuit 48 form a phase lock loop circuit 50. The output signal from the voltage controlled oscillator 46 is also applied to a divide-by-M circuit 52. An output signal from the divide-by-M circuit 52 is applied to a divide-by-two circuit 54 and to an output terminal 56. An output signal from the divide-by-two circuit 54 is applied to a divide-by-N+3 circuit 58 and to an $n$+3 bit register 60 as a clock signal therefor. An output signal from the divide-by-N+3 Circuit 58 is also applied as a transfer control signal to the $n$ + 3-bit register 60. The storage stages of the $n$-bit register 40 are connected to the corresponding stages in the $n$ + 3-bit register 60. In addition, a 010 insert circuit 62 is connected to the register 60 to selectively insert an additional code group at one end of the digital word stored in the register 60, e.g., the register 60 is "hard" wired to have the last three register stages store the code group.

In operation, the circuit of FIG. 2 is effective to insert a fixed digital code group, e.g., a three bit 010 sequence, for each of a predetermined number of data frames, e.g., 30 data frames. The phase lock loop 50 including the phase comparator 42, the low pass filter 44, the VCO 46 and the divide-by-N circuit 48 generates an output signal having a frequency which is an N multiple of the input clock signal from clock line 6. The operation of the phase lock loop 50 is well-known in the art and is discussed in a book entitled "Phaselock Techniques" by F. M. Gardner, published by John Wiley and Sons Inc. and is specifically analyzed in two application notes from Motorola Semiconductor Products Inc., i.e., AN–463 and AN–535. Thus, since the phase comparator 42 is effectively energized only when an input signal on the clock line 6 is coincident with an output signal from the divide-by-N circuit 48, the output signal from the phase comparator 42 is representative of a clock signal divided by N. This output signal from the phase comparator 42 is applied through the low pass filter 44 to the VCO 46 to control the frequency of the output signal from the VCO 46. Thus, the output frequency of the VCO 46 is effective to maintain the input signal on the input of the VCO 46 whereby the output frequency is stabilized at a predetermined value. The clock signal on line 6 is, also, applied to the $n$-bit register 40 to control the entering of the data on the data line 2 into the register 40. Specifically, the clock signal controls the entering of the data in serial form into the register 40 from where it is subsequently read out in parallel format into the register 60. The entering of the data into the register 60 is controlled by a clock pulse derived from the output of the VCO 46. Specifically, the output frequency from the VCO 46 is applied to a divide-by-M circuit 52 and, subsequently, to a divide-by-two circuit 54. Thus, the combination of the two divide circuits 52 and 54 produces a single pulse for each two M-th pulses from the VCO 46. This clock signal is applied to the register 60 as clock B and is used to shift out the contents of the register 60 on the data and code group output line 61. A transfer control signal to transfer the output of the register 40 and the fixed code group from the insert circuit 62 to the register 60 is obtained by dividing the clock signal from the divide-by-two circuit 54 by a further divide-by-$n$ + 3 circuit 58. The clock B signal applied to the register 60 is related to the clock A signal on the input clock line 6 as follows:

Clock B = Clock A·N/2M

This can be rewritten as:

Clock B/Clock A = N/2M = $n/n$+3

The minimal frequency of the VCO 46 is clock B times N, where N is the smallest integer defined as:

N = 2 ($n/n$+3) M

This embodiment is, of course, directed to the insertion of a three bit synchronizing word and an output clock frequency of twice the output bit rate or two times clock B. It should be noted that the circuit can be adapted to fit the requirements of any length synchronizing code word and any ratio of output clock and output data frequencies.

Assuming that a three bit sync word, e.g., 010, is to be added for each 30 data bits, the length of the serial in, parallel out register 40 and the parallel in, serial out register 60 are fixed at 30 and 33 bits, respectively. Using the aforesaid definition of N, the ratio of N to 2M is 11/10, then 11 and 5 are the smallest possible values for N and M, respectively. If a maximum input data frequency for MHz is assumed, the frequency of the VCO 46 is $4 \times 10^6 \times 11 = 44$ MHz. The registers 40 and 60 require a maximum shift rate capability of 4MHz. Thus, as the register 60 is filled by a parallel transfer from the register 40, a code group insertion circuit 62 is effective to supply the fixed code group into the 30 bits stored in the register 60. Subsequently, the entire 33 bits are shifted out serially from the register 60 along output line 61 under control of the transfer signal supply from the divide-by-N + 3 circuit 58. An alternate approach to reduce the requirements of the phase lock loop 50 for tracking the input clock frequency in view of the input clock rate variation corresponding to the range of expected tape recording speeds may be obtained by inserting a programable count or frequency divider between the output of the VCO 46 and the inputs of the modulo N 48 and the modulo M 52 counters. The VCO 46 is then allowed to operate in the highest frequency range required by the input data rate. As indicated above, this would result in an upper VCO frequency of 44 MHz. The selection of the dividing action of the programable divider is arranged to correspond to a variation in the input clock frequency due to a change in tape recording speed to allow the phase lock loop 50 to operate over a wide input data range. If the modulo of the programable divider is unity, the VCO range would be 22 to 44 MHz for a data input rate of 2,000 to 4,000 k bits/second, and a programable divider modulo of four would allow the phase lock loop 50 to operate over an input data range of 500 to 1,000 $k$ bits/second. Accordingly, it may be seen that as the modulo of the programable divider is decreased the natural loop frequency of the phase lock loop 50 will increase.

The input data, after the addition of the fixed code word by the insert circuit 62, is still in the original format, e.g., NRZ. Referring again to FIG. 1, it may be seen that prior to recording the data on the magnetic recording tape 20, the conversion from NRZ format to a predetermined code is accomplished by the data encoder 10. The code may be any suitable well-known code for increasing the packing density of the data on the magnetic recording tape 20. The output from the data encoder 10 is applied to a recording amplifier 14 in combination with an output signal from a bias oscillator circuit 16 for recording on the magnetic tape 20 using a magnetic recording head 18 in a conventional manner.

A conventional playback head 22 is arranged to retrieve the data recorded on a magnetic tape 20 and to apply a playback signal through an amplifier 24 and a signal limiter 26 to a decoder circuit 28. The function of the decoder circuit 28 is to convert the encoded data retrieved from the tape 20 back into the original NRZ format. In addition, the decoder 28 generates an intermediate clock signal which is in a proper time relation and phase with respect to the NRZ data. As a final step of the playback process, the previously added fixed synchronizing words are removed from the reconstructed NRZ data and the clock signal is converted to a clock signal corresponding to the original clock signal used in the recording process. The initial step in the decoding process is a recognition of the synchronizing sync words. This process is based on a prior knowledge of the repetition rate of the synchronizing words. The synchronizing word sequences are detected and decoded using a reference oscillator 34 with a frequency related to the data stream. Once a synchronizing type sequence, i.e., 010, is detected by the decoder 28, a time interval measurement is commenced by the code group detector 32. If another synchronizing type sequence occurs at the expected time limits, synchronization is recognized and the detection of the synchronizing words is continued. In other words, the function of the synchronizing word or code group detector 32 to detect the added synchronizing words without confusing them with similar sequences occurring randomly in the recorded data. Thus, a reference oscillator 34 is used to detect all synchronizing words, i.e., 010, sequences occurring in the data stream. Specifically, the synchronizing words represented by a 010 sequence are detected by measuring the time interval between the detected 010 sequences using the same reference oscillator 34 as a clock source. As soon as an initial 010 sequence is detected by any suitable well-known prior art means such as that shown in U.S. Patent No. 3,493,962, the time interval measurement is started.

This time interval measurement is performed by a process of counting the clock pulses from the reference oscillator 34 by a time interval measurement counter activated by the detection of the "010" sequence, and after a predetermined number of clock pulses have been counted by the aforesaid, a gate is enabled by a signal from the aforesaid counter representative of the counting of the predetermined number of clock pulses to allow the next detected 010 sequence to reset the time interval measurement counter and produce a sync output from the code group detector 32. Thus, any random 010 sequences occurring during the measuring interval between the synchronizing word sequences will not be gated through to reset the interval measuring counter. If the next and succeeding 010 word sequences occur at the expected intervals, synchronization is established and the circuit produces its pulses at its output.

The output of the code group detector 32 is of the exact frequency determined by the data rate and the frequency of the synchronizing word insertion. In the embodiment described herein, a three bit 010 synchronizing word is inserted for each thirty data bits, therefore, the frequency of the recovered synchronizing bits is exactly one thirty-third of the data stream. The output pulse train of the code group detector is multiplied by a factor of 33 resulting in a signal having a frequency exactly equal to the data rate. A further multiplication by a factor of 50 by a frequency multiplier circuit 35 is used to generate the high frequency clock signal for the decoder circuit 28 and the code group removal circuit 36, discussed hereinafter. An output signal from the frequency multiplier 35 is also applied to the code group removal circuit 36 on line 38 and is representative of the data rate clock signal from the code group detector circuit 32 which is produced as discussed above. Since the high frequency clock signal from the frequency multiplier 35 is related to the data stream, the decoder 28 may, in a suitable circuit, be arranged to recognize the code elements corresponding to a logical 1 and a logical 0 by determining the number of clock pulses corresponding to each code element. The output signal of the decoder 28 is a restoration of the coded data into the original format, i.e., NRZ, which output signal is applied to a code group removal circuit 36.

Figure 3:
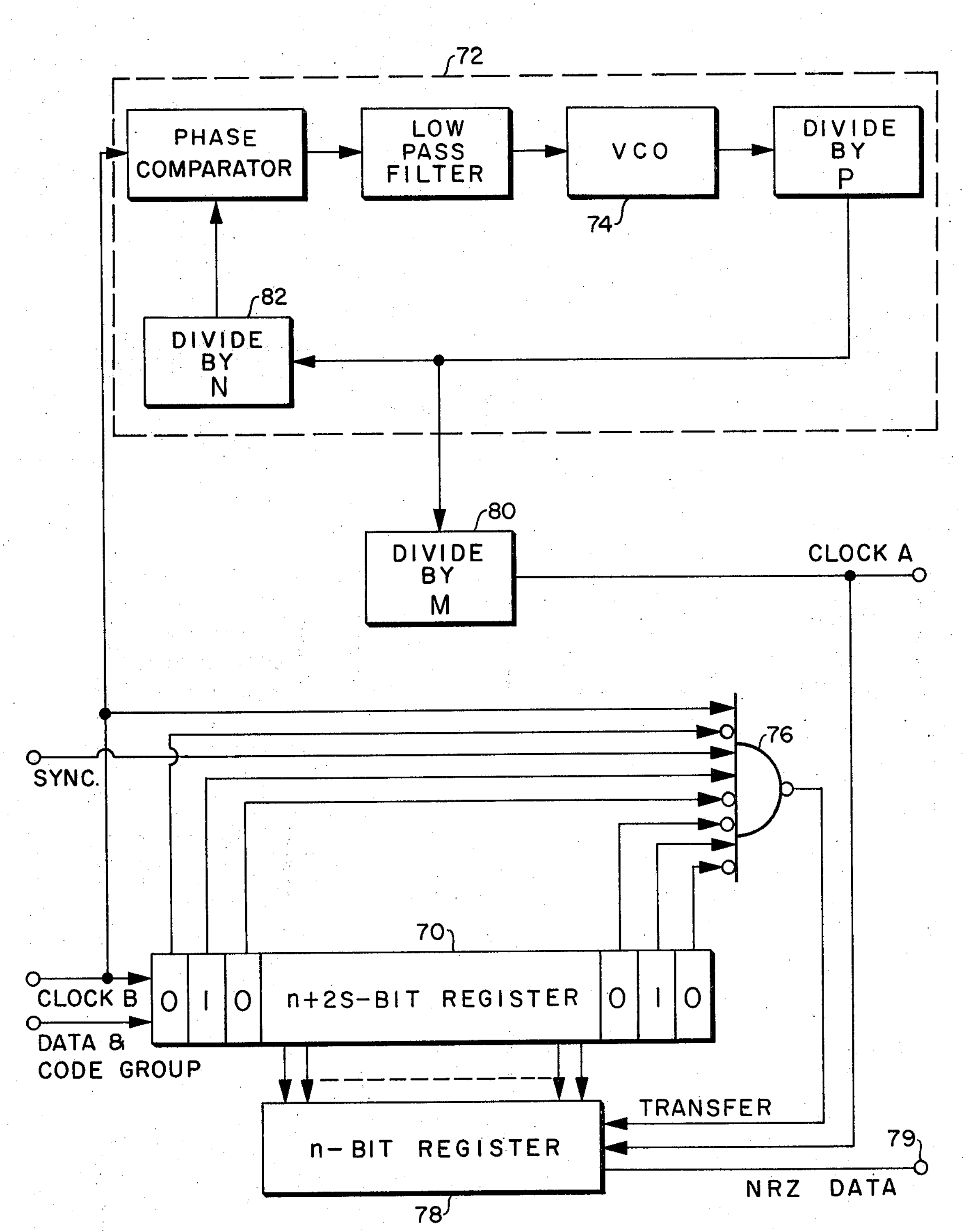
FIG. 3 is a block diagram of a code group removal circuit suitable for use with the system shown in FIG. 1.

Because, in the interest of achieving maximum packing density on the recording medium, a code is used which does not carry clock information, the addition of periodic synchronizing words prior to code inversion and recording, facilitates decoding and clock syntheses of the recorded data. However, in order to provide meaningful data at the output of the recorded signal reproduce electronics, the previously added synchronizing words must be removed and the synthesized clock rate reduced accordingly. A suitable circuit for providing such a function is shown in FIG. 3. The two inputs to the circuit are the restored, or synthesized, clock B signal and the decoded NRZ data still containing the synchronizing words. The clock B signal is used to enter the decoded NRZ data into the $(n + 2S)$ bit serial-in, parallel-out shift register 70. The clock B signal also serves as the input to a phase lock loop 72 similar to the phase lock loop 50 used in the code group insertion circuit shown in FIG. 2. A voltage controlled oscillator 74 in the phase lock loop 72 is locked to the N-th multiple of the clock B frequency. The length of the shift register 70 is the sum of the number of data bits and the length of two of the synchronizing words, each synchronizing word being S bits long, e.g., $S = 3$. A NAND gate 76 is connected to sense the presence of the synchronizing word bits in the register 70. In other words, the inputs to the NAND gate 76 are taken from the first three and the last three storage stages of the register 70. In order to apply similar input signals to the NAND gate 76, the connection from the storage stages of the register 70 which are storing logical zeros during the presence of a synchronizing word are connected to the NAND gate 76 through logical inverters. Two additional inputs to the NAND gate 76 are supplied by the clock B input signal and a synchronizing signal obtained from the frequency multiplier 35 and representing an output signal from the code group detector 32, respectively. When the synchronizing words are present in the aforesaid three storage locations at both ends of the shift register 70, and the other inputs to the NAND gate 76 are of the proper amplitude, i.e., logical 1's, the contents of the center *n* bit positions is transferred to the n-bit parallel-in serial-out register 78. This transfer is controlled by a transfer pulse from the NAND gate 76. A subsequent transfer of the contents of the register 78, i.e., the reproduced data signals, to an output terminal 79 is controlled by a clock A signal produced by a divide-by-M circuit 80 from the phase lock loop 72.

The clock A and clock B frequencies are related to the length of the shift registers 70 and 73 and the moduli of the divide-by-M circuit 80 and a divide-by-N circuit 82 in the phase lock loop, as follows:

Clock A/Clock B = $n/n+3$ = N/M

The minimum frequency of the VCO 74 is N × the clock B frequency where N is the smallest integer defined by:

N = M × $n/n$+S

Assuming a synchronizing word length of three bits (S = 3) and a distance between synchronizing words of thirty ($n$ = 30), the parameters of the circuit are defined as follows:

N = M × 30/30 + 3:

N/M = 10/11;

Therefore: N = 10, M = 11

The VCO frequency is, therefore, 10 times the clock B frequency.

In subsequent operations of the register 70, the input data and code group signals are effective to shift the first code group into the last three stages of the register 70 while filling the center N stages with a new data group and the first three stages with a new code group. At this time, the above transfer operation is repeated and the center $n$ stages of the register 70 are shifted into the register 78 for subsequent serial transfer to the output terminal 79.

Accordingly, it may be seen that there has been provided, in accordance with the present invention, a recording and playback system for providing an encoded recording operation using digital signals combined with synchronizing signals representative of clock information and a reproducing operation for synthesizing a clock signal from the reproduced synchronizing words while extracting the synchronizing words from the reproduced data signals.

The embodiments of the invention in which an exclusive property or privilege is claimed are defined as follows:

1. A signal recording and reproducing system comprising:

a recording means for recording on a record medium including insertion means controlled by a control clock signal applied to said recording means to periodically insert synchronizing words in a data bit stream of a succession of data words to be recorded on the record medium and reproducing means for reproducing the recording produced by said recording means including means for recognizing said periodically inserted synchronizing words and means for removing said synchronizing words from a reproduced succession of data words in response to an output signal from said means for recognizing, said means for removing including means for concurrently producing said control clock signal synchronized with said synchronizing words, wherein said insertion means for inserting synchronizing words includes a digital register having a length equal to a predetermined number of digital data words plus the number of bits in said synchronizing words and means for concurrently reading out said register with the synchronizing words forming a data bit stream with the predetermined number of data words for recording by said recording means.

2. A recording and reproducing system as set forth in claim 1 wherein said synchronizing words are three bit digital words.

3. A signal recording and reproducing system as set forth in claim 1 and including a storage register in said means for removing said synchronizing words, said storage register having a bit length of the number of data bits between said synchronizing words plus the length of two of said synchronizing words.

4. A signal recording and reproducing system as set forth in claim 3 and including a NAND gate connected to said storage register and arranged to sense the presence of synchronizing digital words at the beginning and end of the data bits stored in said storage register to effect a transfer of the data bits from said storage register as an output signal from said reproducing means.

* * * * *